(12) United States Patent
Huang et al.

(10) Patent No.: US 8,801,943 B2
(45) Date of Patent: Aug. 12, 2014

(54) METHOD FOR MANUFACTURING WRAPAROUND SHIELD WRITE HEAD USING HARD MASKS

(75) Inventors: Shiwen Huang, Fremont, CA (US); Fenglin Liu, Milpitas, CA (US); Qiping Zhong, San Jose, CA (US); Kyusik Shin, Pleasanton, CA (US); Yingjian Chen, Fremont, CA (US)

(73) Assignee: HGST Netherlands B.V., Amsterdam (NL)

( * ) Notice: Subject to any disclaimer, the term of this patent is extended or adjusted under 35 U.S.C. 154(b) by 34 days.

(21) Appl. No.: 13/193,520

(22) Filed: Jul. 28, 2011

(65) Prior Publication Data

US 2013/0026131 A1 Jan. 31, 2013

(51) Int. Cl.
B44C 1/22 (2006.01)
(52) U.S. Cl.
USPC ............ 216/22; 216/37; 216/67; 360/125.07; 360/125.15; 360/123.12; 29/603.16
(58) Field of Classification Search
USPC .............. 216/22, 37, 67; 360/125.07, 125.15; 29/603.16
See application file for complete search history.

(56) References Cited

U.S. PATENT DOCUMENTS

| 6,710,973 | B2 | 3/2004 | Okada et al. |
| 7,002,775 | B2 | 2/2006 | Hsu et al. |
| 7,444,740 | B1 | 11/2008 | Chung et al. |
| 7,796,359 | B2 | 9/2010 | Otani et al. |
| 8,139,320 | B2 * | 3/2012 | Hsiao et al. ............. 360/125.07 |
| 8,233,235 | B2 * | 7/2012 | Chen et al. ............... 360/125.15 |
| 2006/0044682 | A1 * | 3/2006 | Le et al. ........................ 360/126 |
| 2006/0158780 | A1 | 7/2006 | Lee et al. |
| 2008/0112081 | A1 | 5/2008 | Matono et al. |
| 2008/0266710 | A1 | 10/2008 | Kameda et al. |
| 2008/0266723 | A1 | 10/2008 | Yazawa et al. |
| 2008/0266724 | A1 | 10/2008 | Yazawa et al. |
| 2009/0122445 | A1 | 5/2009 | Jiang et al. |
| 2009/0139080 | A1 | 6/2009 | Pentek et al. |
| 2010/0112486 | A1 | 5/2010 | Zhang et al. |
| 2010/0149688 | A1 | 6/2010 | Le et al. |
| 2010/0157475 | A1 | 6/2010 | Hsiao et al. |
| 2010/0165517 | A1 | 7/2010 | Araki et al. |
| 2010/0302680 | A1 | 12/2010 | Hirata et al. |
| 2010/0302681 | A1 | 12/2010 | Mino et al. |
| 2010/0321831 | A1 | 12/2010 | Demtchouk et al. |

FOREIGN PATENT DOCUMENTS

| JP | 2008204566 | 9/2008 |
| JP | 2009163836 | 7/2009 |
| JP | 2010061715 | 3/2010 |

* cited by examiner

*Primary Examiner* — Nadine Norton
*Assistant Examiner* — Maki Angadi
(74) *Attorney, Agent, or Firm* — Billion & Armitage (57) ABSTRACT

The present disclosure describes a method for manufacturing a full wraparound shield damascene write head through the implementation of a three layered (tri-layered) hard mask. According to an embodiment of the invention, the various layers of hard mask are used for different purposes during the formation of a write head. The wraparound shield head of the present invention exhibits improved physical characteristics that further result in improved performance characteristics. Use of the hard mask layers according to the present invention allows for use of manufacturing processes that can be more closely controlled than those processes used in other processes. For example, smaller dimension lithographic techniques can be used. Also, reliance on certain CMP processes is not necessary where the use of CMP processes is not as well-controlled as deposition or lithographic techniques as is possible using the present invention.

27 Claims, 11 Drawing Sheets

METHOD FOR MANUFACTURING WRAPAROUND SHIELD WRITE HEAD USING HARD MASKS

FIELD OF THE INVENTION

The present invention generally relates to the field of computer hard disks. More particularly, the present invention relates to an improved write head for use in computer hard disks.

BACKGROUND OF THE INVENTION

Hard disk technology is constantly evolving. Advances in nanomagnetics, magnetic ultrathin films, magnetoelectronics, as well as device processing, have advanced this technology. It can be expected that the future will continue to bring further advances in hard disk technology.

The recording head of a hard disk has three main components: (1) the read sensor ("reader"); (2) the write transducer ("writer"), which is a microfabricated planar electromagnet with a narrow pole that creates a high density of magnetic flux in proximity to the media; and (3) the slider, which is a shaped piece of substrate (typically alumina-titanium carbide) onto which the writer and read sensor are built, and is engineered to "fly" only a few nanometers above the spinning media disk.

The writer is designed to fly just a few nanometers above a spinning disk at up to 15000 revolutions per minute.

The subject of the present invention is the writer, but it is understood that for any writer, there is an appropriate combination of sensor and slider which forms a coherent recording head device and, together with the chosen media, mechanical characteristics, and electronics, forms a complete recording system. The recording environment in which the head is expected to operate is first introduced, including media characteristics, magnetic interference and shielding, and signal-to-noise (SNR) considerations. These constraints put specific boundaries on the sizes, geometries, and magnetic properties which a writer must achieve.

The magnetic recording process utilizes a thin film transducer for the creation or writing of magnetized regions (bits) onto a thin film disk and for the detection or reading of the presence of transitions between the written bits. The thin film transducer is referred to as a thin film head. It consists of a read element, which detects the magnetic bits, and a write element, which creates or erases the bits.

In order to meet the ever increasing demand for improved data rate and data capacity, research has focused on the development of perpendicular recording systems. A traditional longitudinal recording system stores data as magnetic bits oriented longitudinally along a track in the plane of the surface of the magnetic disk. This longitudinal data bit is recorded by a fringing field that forms between a pair of magnetic poles separated by a write gap.

Figure 1:
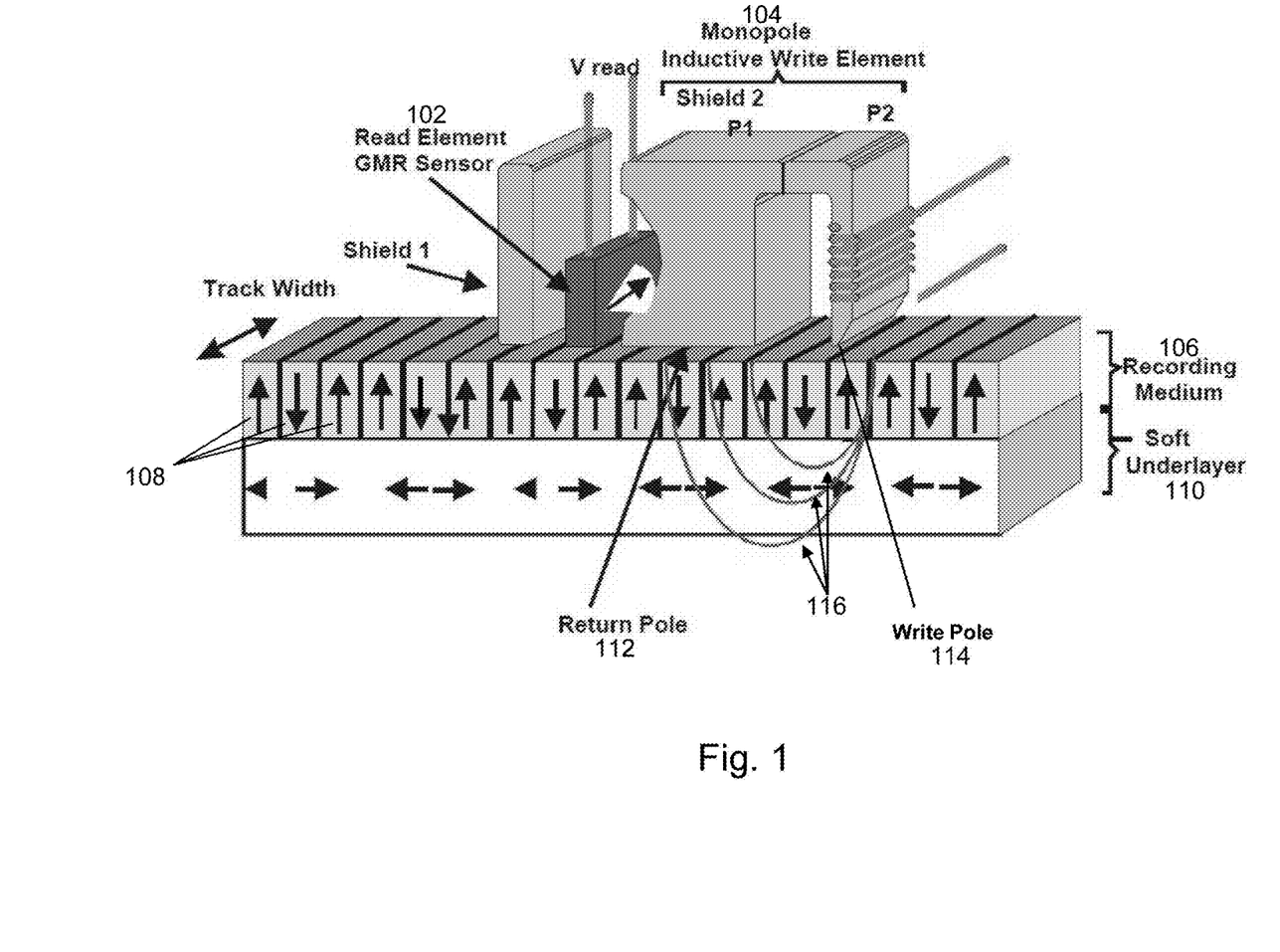
FIG. 1 is schematic illustration of a disk drive reader and sensor.

A perpendicular recording system, on the other hand, records data as magnetic transitions oriented perpendicular to the plane of the magnetic disk. FIG. 1 is a schematic of the recording process in a perpendicular recording system. Shown in FIG. 1 is read sensor 102, write element 104, and recording medium 106. The perpendicular write element 104 has a write pole with a very small cross section and a return pole having a much larger cross section. A strong, highly concentrated magnetic field emits from write pole 114 in a direction perpendicular to recording medium 106 to magnetize perpendicular bits 108. Perpendicular write element 104 writes magnetic transitions vertically within recording medium 106 by orienting the magnetic field 116 perpendicular to the direction of recording medium 106. Magnetic field 116 created by this perpendicular head returns through a magnetically soft underlayer 110 within the medium. In this way the recording medium 106 lies within the write gap.

The resulting magnetic flux returns through return pole 112 where it is sufficiently spread out and weak that it will not erase the signal recorded by write element 104. The resulting perpendicular write fields 116 can be up to two times larger than longitudinal write fields, thus enabling the perpendicular write element to write information on high coercivity media that is inherently more thermally stable. In perpendicular recording, the bits do not directly oppose each other resulting in a significantly reduced transition packing. This allows bits to be more closely packed with sharper transition signals, facilitating easier bit detection and error correction. During a read operation, read sensor 102 detects perpendicular bits 108 on recording medium 106.

In a disk recording system, successive bits are written onto the disk surface in concentric rings or tracks separated by a guard band. The head transducer is attached to a suspension, and the suspension is attached to an actuator which controls the position of the transducer in a plane above the disk surface. A specially-designed topography on the lower surface of the slider (known as the air bearing surface or ABS) allows the head to "fly" above the rotating disk (typically 4200-15000 rpm), and controls the height of the transducer above the disk surface, typically 10 to 15 nm.

Figure 2:
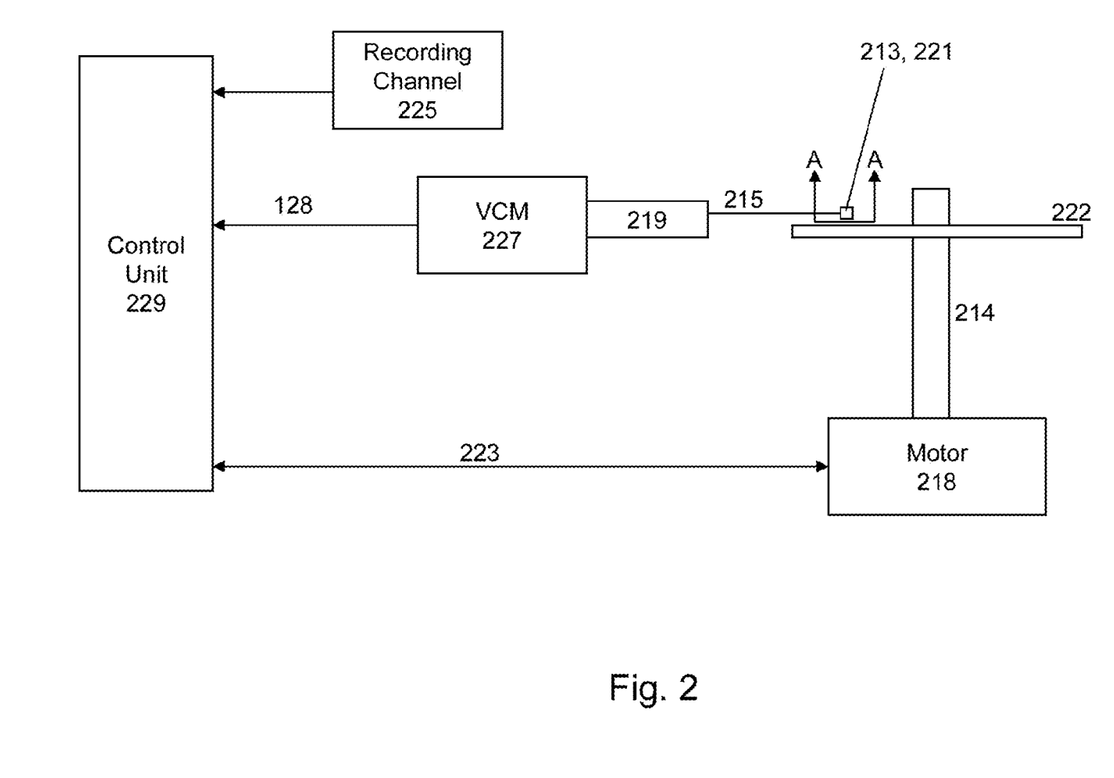
FIG. 2 is a schematic illustration of a disk drive system in which the invention might be embodied.

Referring now to FIG. 2, there is shown an implementation of a disk drive 200. As shown in FIG. 2, at least one rotatable magnetic disk 212 is supported on a spindle 214 and rotated by a disk drive motor 218. The magnetic recording on each disk is in the form of annular patterns of concentric data tracks on the magnetic disk 212.

At least one slider 213 is positioned near the magnetic disk 212, each slider 213 supporting one or more magnetic head assemblies 221. As the magnetic disk rotates, slider 213 moves radially in and out over the disk surface 222 so that the magnetic head assembly 221 may access different tracks of the magnetic disk where desired data are written. Each slider 213 is attached to an actuator arm 219 by way of a suspension 215.

Suspension 215 provides a spring force which biases slider 213 against disk surface 222. Each actuator arm 219 is attached to actuator 227. Actuator 227 as shown in FIG. 2 may be a voice coil motor (VCM). The VCM comprises a coil movable within a fixed magnetic field, the direction and speed of the coil movements being controlled by the motor current signals supplied by controller 229.

During operation of the disk storage system, the rotation of magnetic disk 212 generates an air bearing between slider 213 and the disk surface 222 which exerts an upward force or lift on the slider. The air bearing thus counterbalances the spring force of suspension 215 and supports slider 213 off and slightly above the disk surface by a small, substantially constant spacing during normal operation.

The various components of the disk storage system are controlled in operation by control signals generated by control unit 229. Control signals may also include internal clock signals. Typically, control unit 229 comprises logic control circuits, digital storage and a microprocessor. Control unit 229 generates control signals to control various system operations such as drive motor control signals on line 223 and head position and seek control signals on line 228. The control signals on line 228 provide the desired current profiles to optimally move and position slider 213 to the desired data track on disk 212. Write and read signals are communicated to and from write and read heads 221 by way of recording channel 225.

Figure 3:
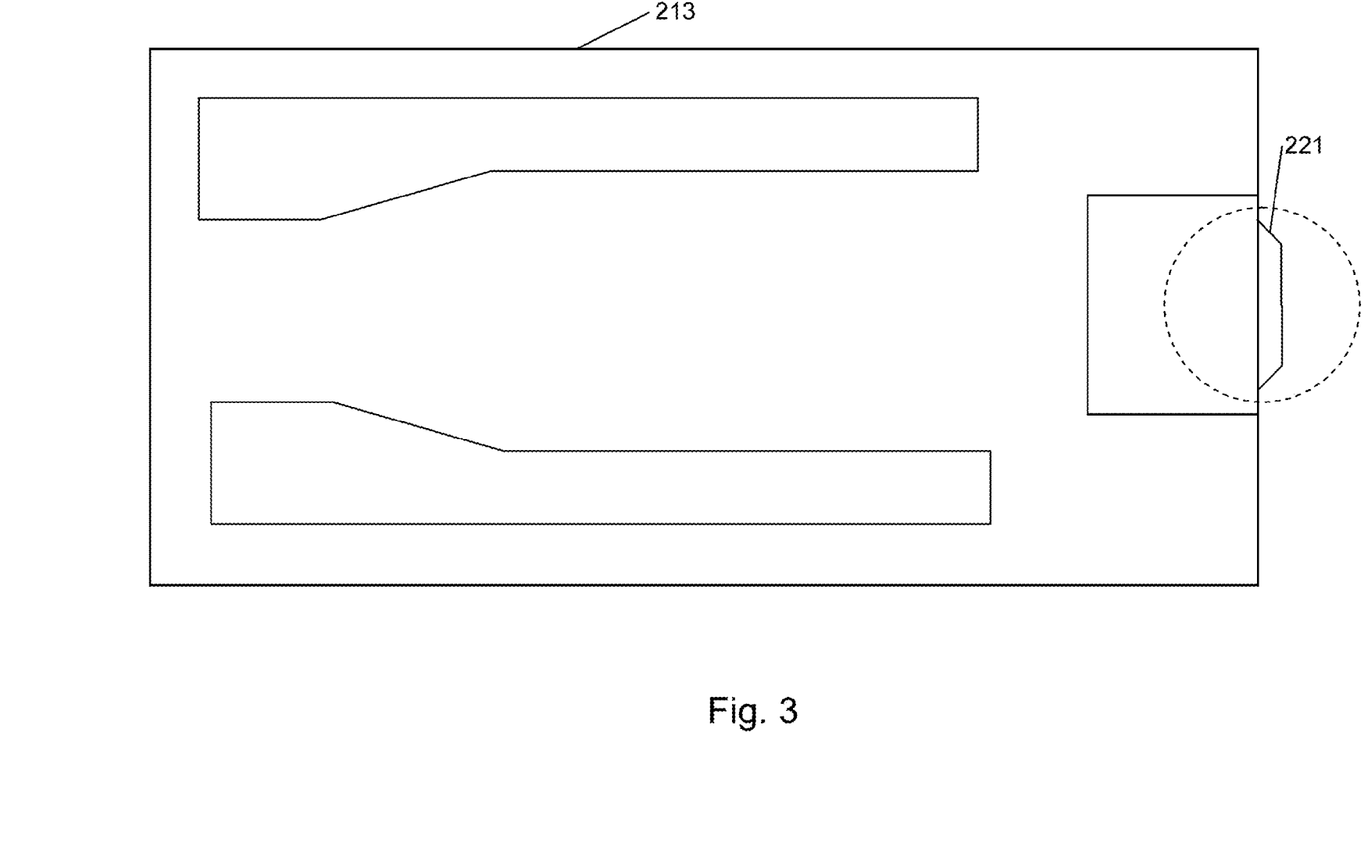
FIG. 3 is an ABS view of a slider illustrating the location of a magnetic head thereon.

With reference to FIG. 3, the orientation of magnetic head 221 in slider 213 can be seen in more detail. FIG. 3 is an ABS view of slider 213, and as can be seen, the magnetic head, including an inductive write head and a read sensor, is located at a trailing edge of the slider.

In perpendicular magnetic recording, the write head may include a trailing shield (TS) of magnetically permeable material that faces the recording layer and is spaced from the write pole in the along-the-track direction by a nonmagnetic gap. The TS slightly alters the angle of the write field and makes writing more efficient.

The write head may also include a pair of side shields located on opposite sides of the write pole in the cross-track direction and separated from the write pole by a nonmagnetic gap layer. The side shields control the write width and help reduce adjacent-track-erasure. Typically the TS and side shields are connected or formed as a single-piece structure to form a wraparound shield (WAS) that generally surrounds the write pole. A perpendicular magnetic recording write head with a WAS is described in U.S. Pat. No. 7,002,775 B2, assigned to the same assignee as this application.

Perpendicular magnetic recording at high a real density is limited by the strength of the write field and the write field gradient at the point of writing. Additionally, a high write field increases the likelihood of erasure of adjacent tracks, especially when the write head is located at a high skew angle relative to the data track to be written.

The above description of a typical magnetic disk storage system, and the accompanying illustrations of FIG. 1-3 are for representation purposes only. It should be apparent that disk storage systems may contain a large number of disks and actuators, and each actuator may support a number of sliders.

What is needed is a well-controlled process for making a magnetic recording write head. With the improved process, the magnetic recording write head can be made to exhibit better performance.

SUMMARY OF THE INVENTION

The present disclosure describes a method for manufacturing a full wraparound shield damascene write head through the implementation of a three layered (tri-layered) hard mask. According to an embodiment of the invention, the various layers of hard mask are used for different purposes during the formation of a write head. For example, the third hard mask is used to control an RIE process during the formation of the write head. The second hard mask is serves as a CMP stop layer during the formation of the write head. The third hard mask is used as a stop layer for an RIE process and is further used to control a tilted etch process during the formation of a taper in a shield layer.

The wraparound shield head of the present invention exhibits improved physical characteristics that further result in improved performance characteristics. Use of the hard mask layers according to the present invention allows for use of manufacturing processes that can be more closely controlled than in other processes. For example, smaller dimension lithographic techniques can be used. Also, reliance on certain CMP processes is not necessary where the use of CMP processes is not as well-controlled as deposition or lithographic techniques.

BRIEF DESCRIPTION OF THE DRAWINGS

The following drawings will be used to more fully describe embodiments of the present invention.

DETAILED DESCRIPTION OF THE INVENTION

The following description is of certain preferred embodiments presently contemplated for carrying out this invention. This description is made for the purpose of illustrating the general principles of this invention and is not meant to limit the inventive concepts claimed herein.

Driven by the increasing demand on areal density in hard disk drive, the thin film head manufacturing industry has considered a wraparound shield (WAS) device. A typical device uses a damascene perpendicular magnetic writer (PMR) heads where the WAS consists of, but is not limited to, two major features: Leading Edge Shielding (LES) and Leading Edge Taper (LET). Manufacturing control of shield height and leading edge taper take-off angle as well as taper length can significantly affect writer performance. Also, shielding needs to be exposed at the air bearing surface (ABS) with about a few submicrons. To achieve this using current manufacturing technology, the formation of the shield is typically performed using a 248 nm DUV electroplating process with an accompanying CMP step. Tools to perform the 248 nm DUV process and current photolithography tools struggle to meet device performance requirements. As a result, the uniformity of shield thickness defined by a CMP process is difficult.

Figure 4A:
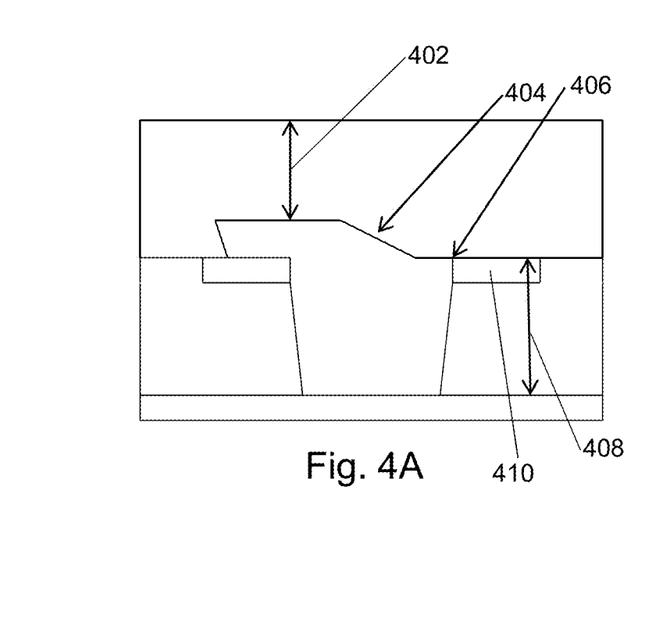
FIG. 4A is magnetic write head according to other processes.

Shown in FIG. 4A are the results of a typical LES/LET process. As shown, Damascene trench AlOx 402 of other processes is controlled by a CMP process that exhibits large variations leading to loss of close process control especially at every decreasing geometries. LET 404 of other processes is formed by use of a conventional resist mask that results in large process variations when used in a necessary angled etching angle. In other processes, LES position 406 is controlled by, for example, a 248 nm process and cannot make use of higher resolution tools. LES thickness 408 of other processes is controlled by a CMP process that results in large process variations. Also, other process use a magnetic NiFe RIE stop layer 410 that can be susceptible to corrosion. Using methods of the present invention, however, these and other characteristics of the typical process can be improved.

This invention introduces a new way of manufacturing a wraparound shield write head. Using certain current manufacturing technology in conjunction with certain hard mask layers, the write head of the present invention is made utilizing a 193 nm DUV photolithography technology and without using CMP processes to define shield thicknesses.

The present disclosure describes how, in an embodiment, an NiCr/Ir/NiCr Tri-Layer hard mask can serve various purposes for manufacturing a Leading Edge Shield (LES) and Leading Edge Taper (LET) with improved characteristics over typical methods. The LES/LET formed using methods of the present invention exhibits significant advantages. For example, using the present invention, lithographic patterning is performed using smaller geometry 193 nm DUV technology. As a result, critical dimensions and overlay controls are improved over typical methods that use a 248 nm DUV process. Also, shield thickness is not determined by electroplating and CMP such as in typical processes. Instead, shield thickness is determined by the better controlled process of alumina deposition. The position of the Leading Edge Taper and control of the so-called take-off angle are determined by a well-controlled hard mask in the present invention. Also, the Damascene RIE stop layer of the present invention is a non-magnetic that is more flexible for future processes and designs.

The present invention will be described with reference to FIGS. 5A-5N where reference numbers will be used to refer to various structures. It should be understood that where the same numbers are used amongst the figures the same or substantially the same structure is referenced. It should also be understood that the drawings are not to scale.

Figure 5A:
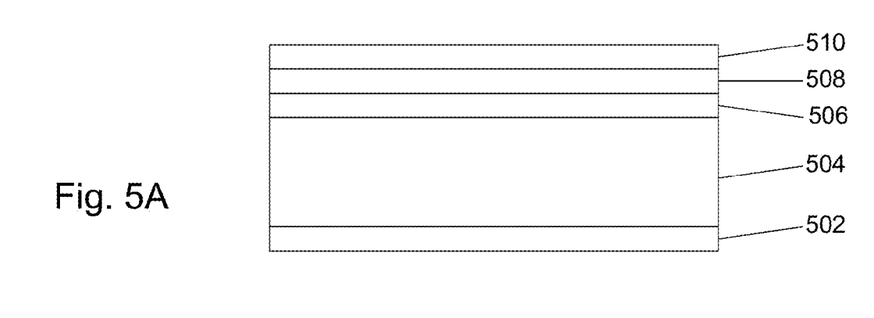
FIGS. 5A-5N illustrate a method for making a write head according to an embodiment of the invention.

Shown in FIG. 5A is a stack of various layers of material that are deposited according to using methods known to those of ordinary skill in the art. So as to focus the present disclosure without distracting from the present invention, focus will be made on these layers. Formation of the underlying layers, generically referenced as the substrate, is well known in the art, for example, as disclosed in U.S. Pat. No. 7,002,775 B2, assigned to the same assignee as this application.

As shown in FIG. 5A, the stack on the substrate comprises, in the order shown starting from the bottom, a lower-most NiCr layer 502, an AlOx layer 504, an NiCr layer 506, a Ir layer 508, and an NiCr layer 510. As will be shown NiCr layer 510 acts as Leading Edge Shield (LES) RIE mask. Ir layer 508 acts as an LES CMP stop layer and Leading Edge Taper (LET) end point. And NiCr layer 506 acts as a Damascene RIE stop layer.

Figure 5B:
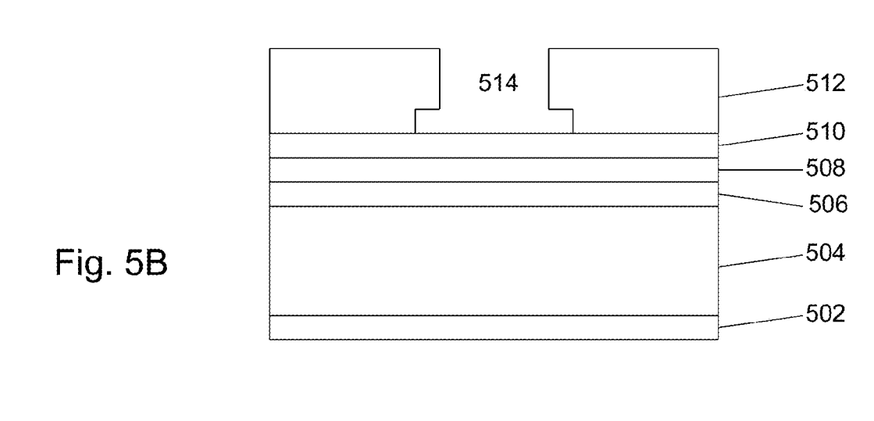

Shown in FIG. 5B is photomask 512 that is patterned with opening 514 using methods known to those of ordinary skill in the art. In an embodiment, opening 514 is made with an undercut designed to exhibit certain etching results. Such undercut may not be necessary for all implementations. In an embodiment, a hard mask IBE pattern transfer is used. Also, in an embodiment, photomask 512 is patterned by a 193 nm DUV lithography technique. Other etching techniques can be used as is known to those of ordinary skill in the art.

Figure 5C:
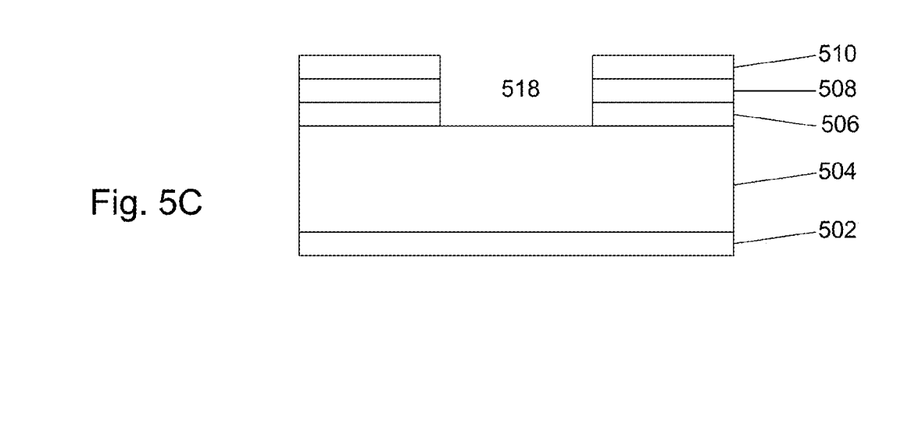

After an etching process appropriate for NiCr layer 510, Ir layer 508 and NiCr layer 506 with photomask 512 in place, opening 518 is formed in layers 510, 508, and 506 as shown in FIG. 5C. In an embodiment, an ashing process is used to remove photomask 512. Alternatively, the etching process used in conjunction with photomask 512 is closely controlled so as to remove substantially all of photomask 512 while leaving substantially enough NiCr layer 510.

As shown in FIG. 5C, the tri-mask layers of the present invention are now formed. The tri-mask layers include layers 510, 508, and 506 with opening 518. The use of the tri-mask layers according to the present invention will now be described.

Figure 5D:
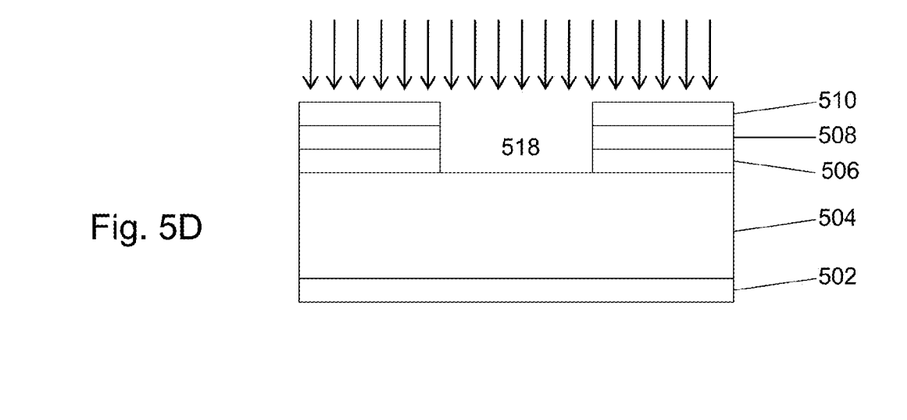
Figure 5E:
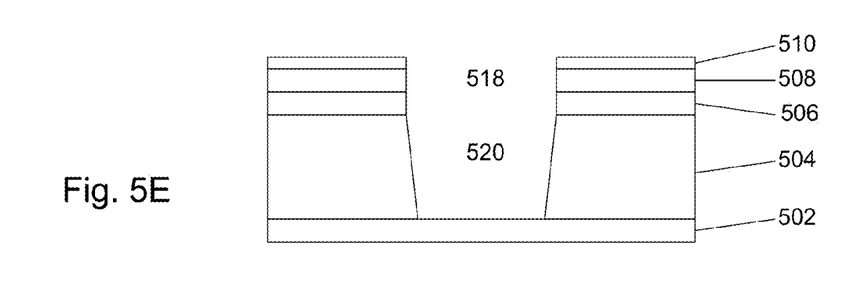

Using opening 518 in the tri-mask layers, an etching process is used upon the exposed AlOx layer 504 as shown in FIG. 5D. In an embodiment, the etching process is an RIE anisotropic etching process. In an embodiment of the invention, NiCr layer 502 acts as an RIE stop layer. After the etching process is completed, opening 520 is formed with substantially all of the AlOx removed at the bottom of the opening. As part of the etching process, it is desired to remove as much of NiCr layer 510 as possible so as to facilitate subsequent steps to be described.

Figure 5F:
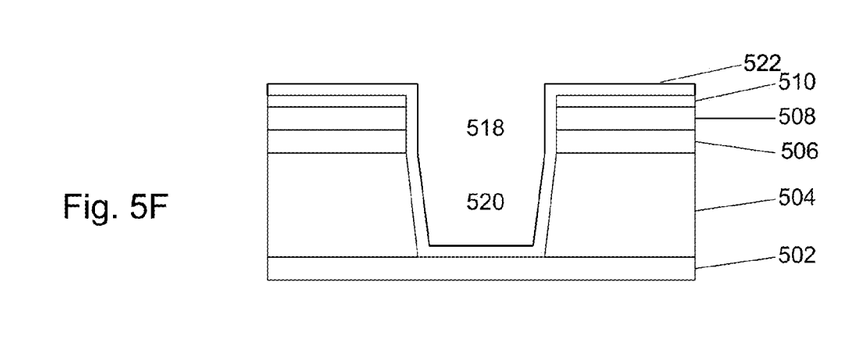
Figure 5G:
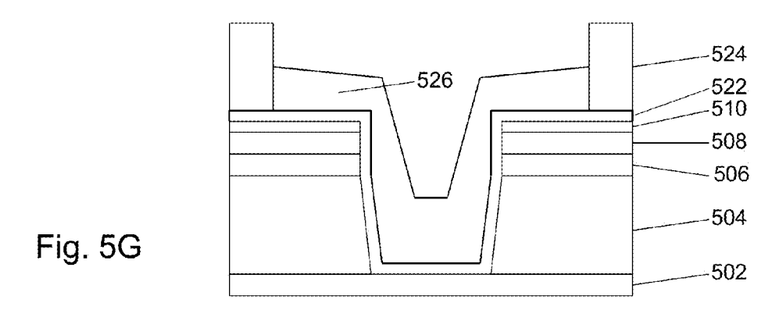

As shown in FIG. 5F a magnetic seed layer 522 is deposited on the exposed surfaces. As shown in FIG. 5G, photomask 524 is formed and patterned so as to allow for the deposition and plating of frame plating 526 within opening 520 and above the exposed NiCr layer 510 of FIG. 5G.

Figure 5H:
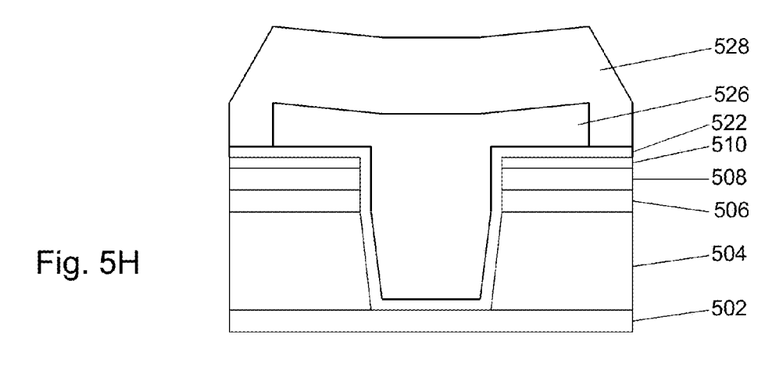

Shown in FIG. 5H is the completed plating process with completed plating 526 and with photomask 524 removed by methods known to those of ordinary skill in the art such as an ashing process.

Figure 5I:
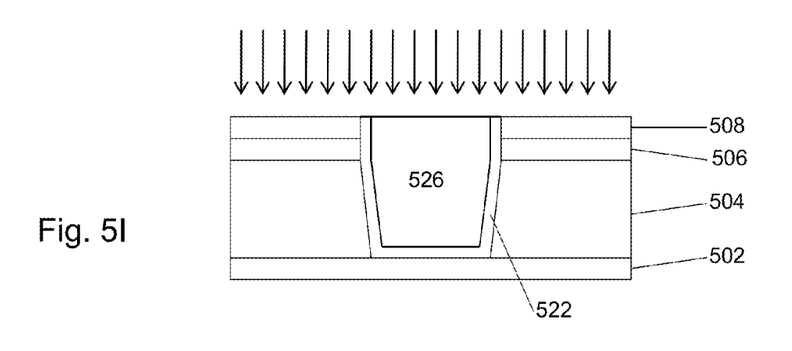

Shown in FIG. 5I is the result of depositing AlOx layer 528 over the exposed top surfaces. A CMP process is then performed to flatten the top surface while removing any remaining NiCr layer 510. Advantageously, Ir layer 508 acts as a CMP stop layer. Note that AlOx layer 528 was formed so as to improve the performance of the CMP process. Other techniques known in the art can also be used to perform an appropriate CMP process. Note also that the top-lying magnetic seed layer 522 is also removed.

Figure 5J:
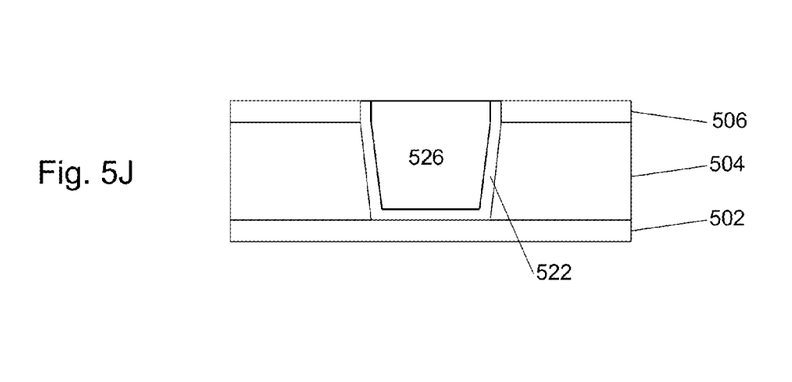

As shown in FIG. 5I, a process is then initiated to remove any remaining Ir layer 508. In an embodiment, an ion beam etch process is used to effect clean up of the exposed top-most surface. As shown in FIG. 5J, a well-formed Leading Edge Shield (LES) is achieved while consuming through two of the tri-mask layers. At this point only NiCr layer 506 remains. Its function according to an embodiment of the invention will now be described.

Figure 5K:
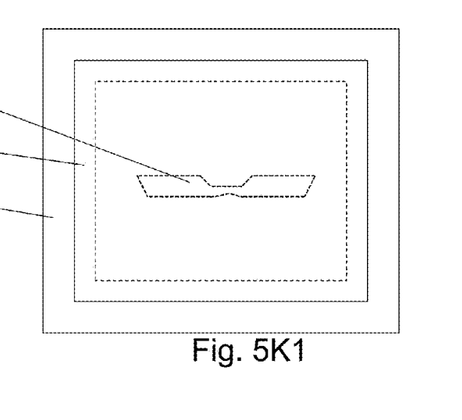
Figure 5K:
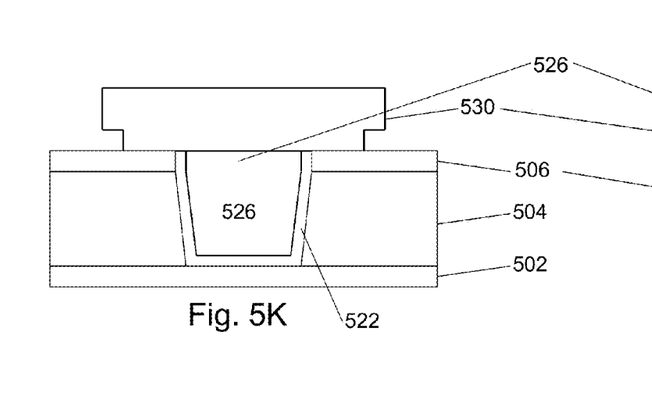

Shown in FIG. 5K is photomask 530 that is patterned to expose portions of NiCr layer 506 at a distance beyond the edge of filled opening 532. As shown, photomask 530 includes an undercut that in an embodiment of the invention improves a subsequent etch process. Other techniques are also appropriate so as assure a proper subsequent etching.

Shown in FIG. 5K1 is a top view of the structure shown in FIG. 5K. Note the geometry of photomask 530 and the dimensions of NiCr layer 506 as well as frame plating 526.

Figure 5L:
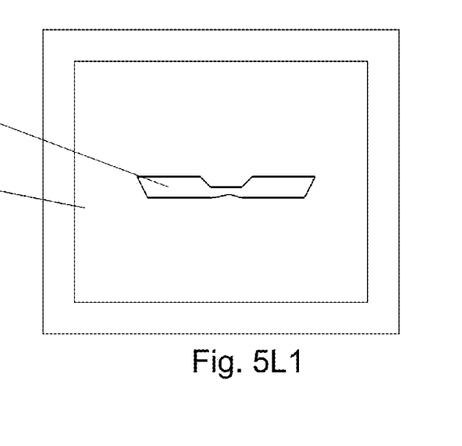
Figure 5L:
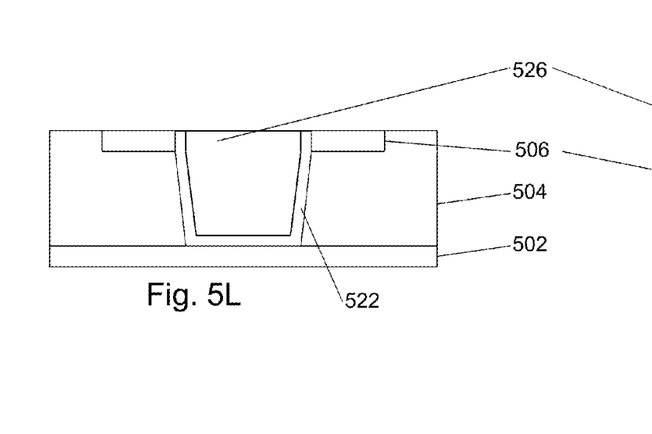

An etching process is then initiated to remove NiCr layer 506 while preferably removing little of AlOx layer 504. A refill AlOx deposition process can be used to maintain a planar top surface as shown in FIG. 5L. In an embodiment, after the refill process, an etching or CMP process can be used to improve planarity of the top surface. Shown in FIG. 5L1 is a top view of the structure shown in FIG. 5L. Note the dimensions of the remaining NiCr layer 506 and the exposed frame plating 526. At this point NiCr layer 506 has been formed as an appropriate RIE stop layer. Note, however, that only the shield area (i.e., the LES/LET area) is magnetic, but the majority of the RIE stop layer is non-magnetic.

Figure 5M:
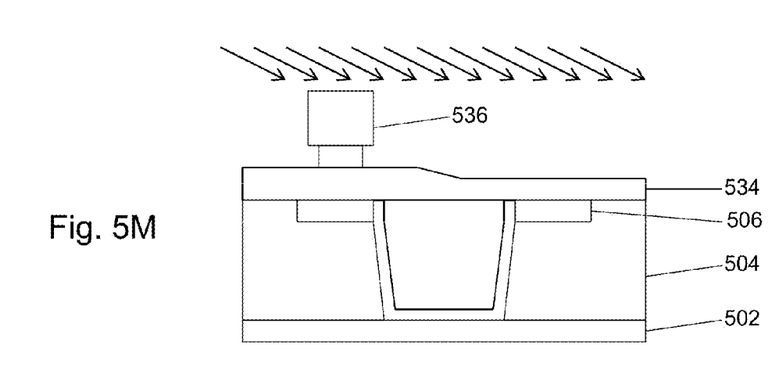

As shown in FIG. 5M, a the formation of a Leading Edge Taper using a full film NiFe deposition process is initiated by depositing NiFe Layer 534. Shown in FIG. 5M is patterned photomask 536 that is configured to provide a mask for a tilted angle mill that forms the LET. Because of the presence of NiCr layer 506, over milling can proceed to assure sufficient removal of material while also assuring that the LET structure will continue to be properly formed.

Figure 5N:
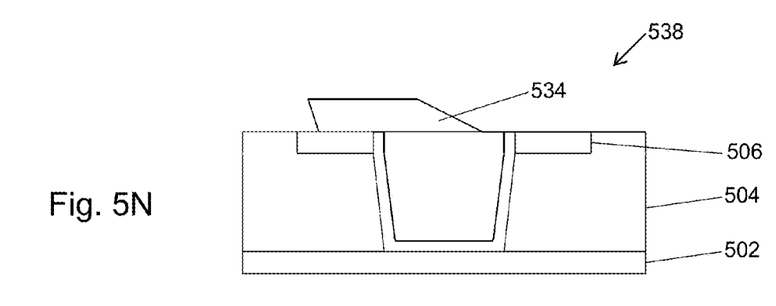

Upon removal of photomask 536, the formation of the full wrap around shield LES/LET 538 is complete as shown in FIG. 5N.

Figure 4B:
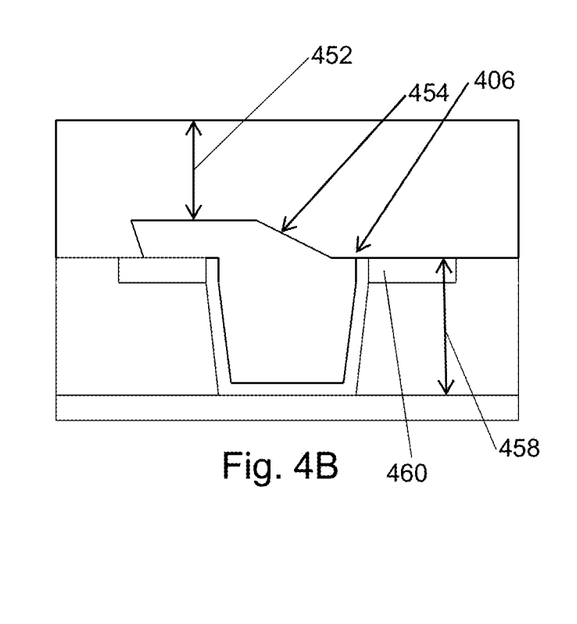
FIG. 4B is a magnetic write head according to an embodiment of the present invention.

To understand the advantages of the present invention, it is useful to compare it to current technology. Shown in FIG. 4A are the results of a typical LES/LET process and shown in FIG. 4B are the results of the use of the present invention. For example, as shown, Damascene trench AlOx 402 of other processes is controlled by a CMP process that exhibits large variations leading to loss of close process control especially at every decreasing geometries. Damascene trench AlOx 452 of the present invention, however, is controlled by a deposition process only. In being so controlled, Damascene trench AlOx 452 can be more precisely controlled.

LET 404 of other processes is formed by use of a conventional resist mask that results in large process variations when used in a necessary angled etching angle. But LET 454 that is formed by the present invention and, in particular, a hard mask mill results in much better control of the position and the so-called take-off angle.

In other processes, LES position 406 is controlled by, for example, a 248 nm process. In the method of the present invention, however, LES position 456 is controlled by processes with better control such as a 193 nm process, for example.

LES thickness 408 of other processes is controlled by a CMP process that results in large process variations. Contrastingly, LES thickness 458 is controlled by a deposition process that can be much better and precisely controlled.

Also, other processes use a magnetic NiFe RIE stop layer 410 that can be susceptible to corrosion. But the process of the present invention uses a non-magnetic RIE stop layer 460 that is not susceptible to corrosion and its deteriorating effects.

It should be appreciated by those skilled in the art that the specific embodiments disclosed above may be readily utilized as a basis for modifying or designing other write elements. It should also be appreciated by those skilled in the art that such modifications do not depart from the scope of the invention as set forth in the appended claims.

What is claimed is:

1. A method for manufacturing a tapered leading pole device for a magnetic write head, comprising:
    depositing an insulation layer on a substrate;
    depositing a first, second, and third hard mask layers on the insulation layer;
    patterning the first, second, and third hard mask layers so that the insulation layer is exposed;
    controlling an etching process using the third hard mask and forming an opening in the insulation layer, wherein the etching process substantially removes the third hard mask;
    controlling an etching process using the second hard mask layer and performing a planarizing etchback that substantially removes the second hard mask layer; and
    controlling a tilted etching process using the first hard mask layer and forming a taper in a magnetic material to create the tapered leading pole device.

2. The method of claim 1, wherein the first hard mask is comprised of NiCr.

3. The method of claim 1, wherein the wherein the third hard mask is comprised of NiCr.

4. The method of claim 1, wherein the second hard mask is comprised of Ir.

5. The method of claim 1, wherein the magnetic material is NiFe.

6. The method of claim 1, wherein the second hard mask layer serves as a planarization stop layer.

7. The method of claim 1, wherein the third hard mask layer serves as an etch stop layer.

8. The method of claim 1, further comprising depositing a seed layer on exposed surfaces of the insulation layer and the third hard mask layer.

9. The method of claim 1, further comprising depositing a fourth hard mask layer before depositing the insulation layer.

10. The method of claim 1, wherein the fourth hard mask layer serves as an etch stop layer.

11. The method of claim 1, wherein controlling the tilted etching process using the third hard mask layer and forming a taper in a magnetic material includes providing a photomask for a tilted angle mill.

12. A method for manufacturing a tapered leading pole device for a magnetic write head, comprising:
    depositing an insulation layer on a substrate;
    depositing a first, second, and third hard mask layers on the insulation layer;
    patterning the first, second, and third hard mask layers so that the insulation layer is exposed;
    etching an opening in the insulation layer using the third hard mask layer while eroding at least a portion of the third hard mask layer;
    depositing a magnetic material in the opening and at least some material outside the opening;
    performing a planarization process to expose the second hard mask layer;
    performing an etching process to remove the second hard mask layer at least a portion of the magnetic material;
    patterning the first hard mask layer;
    depositing a magnetic layer;
    forming a taper using a tilted etching process and the first hard mask.

13. The method of claim 12, wherein the first hard mask is comprised of NiCr.

14. The method of claim 12, wherein the wherein the third hard mask is comprised of NiCr.

15. The method of claim 12, wherein the second hard mask is comprised of Ir.

16. The method of claim 12, wherein the magnetic material is NiFe.

17. The method of claim 12, wherein the second hard mask layer serves as a planarization stop layer.

18. The method of claim 12, wherein the third hard mask layer serves as an etch stop layer.

19. The method of claim 12, further comprising depositing a seed layer on exposed surfaces of the insulation layer and the third hard mask layer.

20. The method of claim 12, further comprising depositing a fourth hard mask layer before depositing the insulation layer.

21. The method of claim 12, wherein the fourth hard mask layer serves as an etch stop layer.

22. The method of claim 12, further comprising patterning the magnetic material.

23. The method of claim 12, wherein forming the taper is performed using an ion milling process.

24. The method of claim 12, wherein the planarization process is a CMP process.

25. The method of claim 12, wherein the patterning is performed using an organic material.

26. The method of claim 12, further comprising depositing an insulation layer on the taper.

27. The method of claim 12, wherein forming a taper using a tilted etching process and the third hard mask includes providing a photomask for a tilted angle mill.

* * * * *